April 12, 1938.　　　　　J. B. MAST　　　　　2,114,082
TELLURIAN
Filed Oct. 15, 1937　　　3 Sheets-Sheet 1
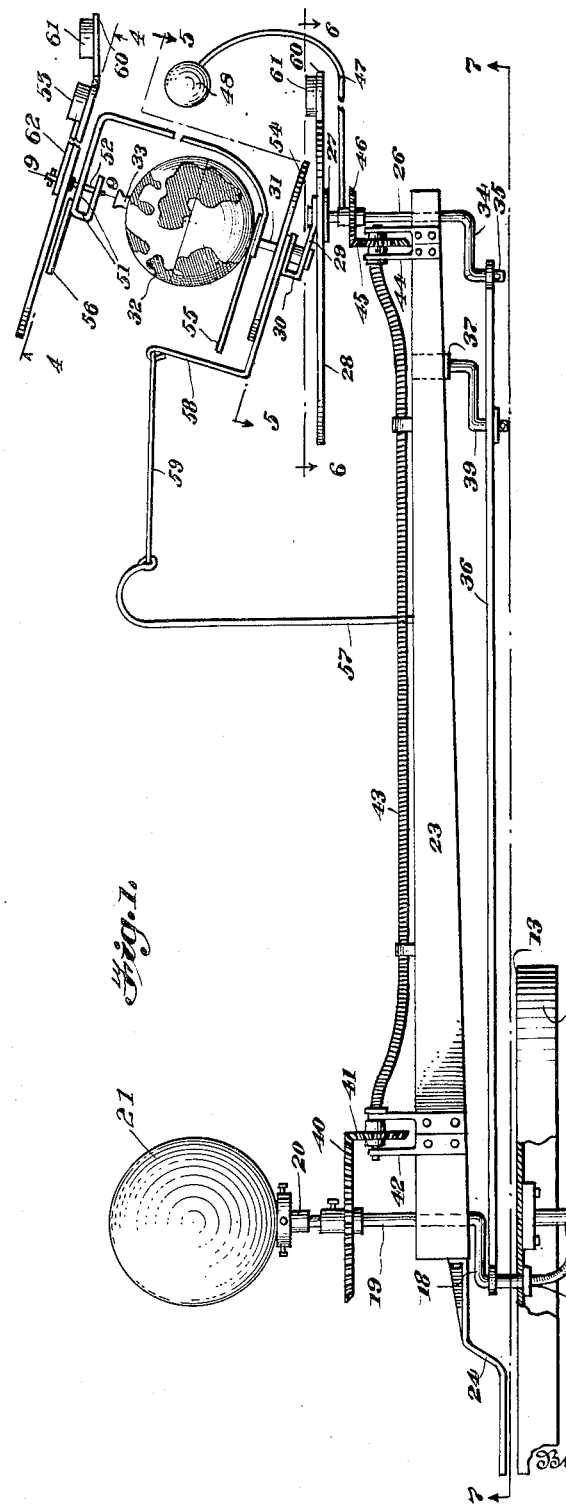
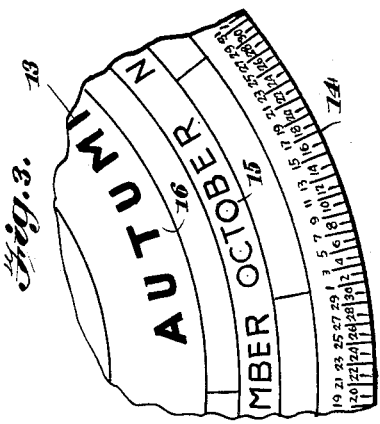
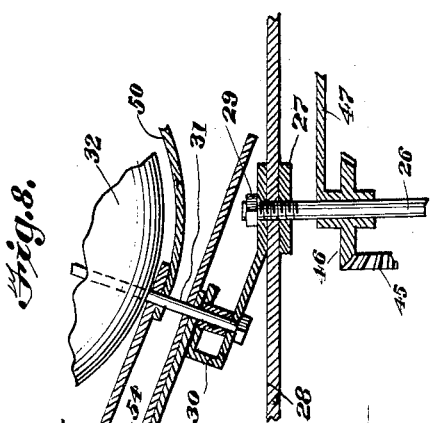
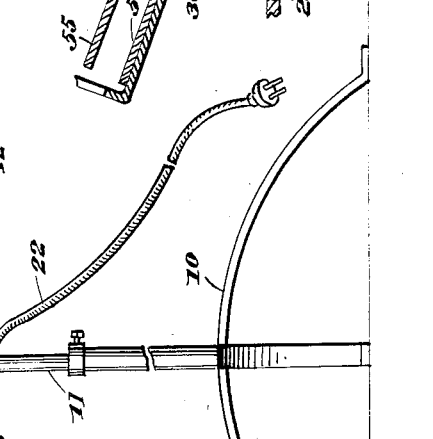
Inventor
JOHN B. MAST
Attorney

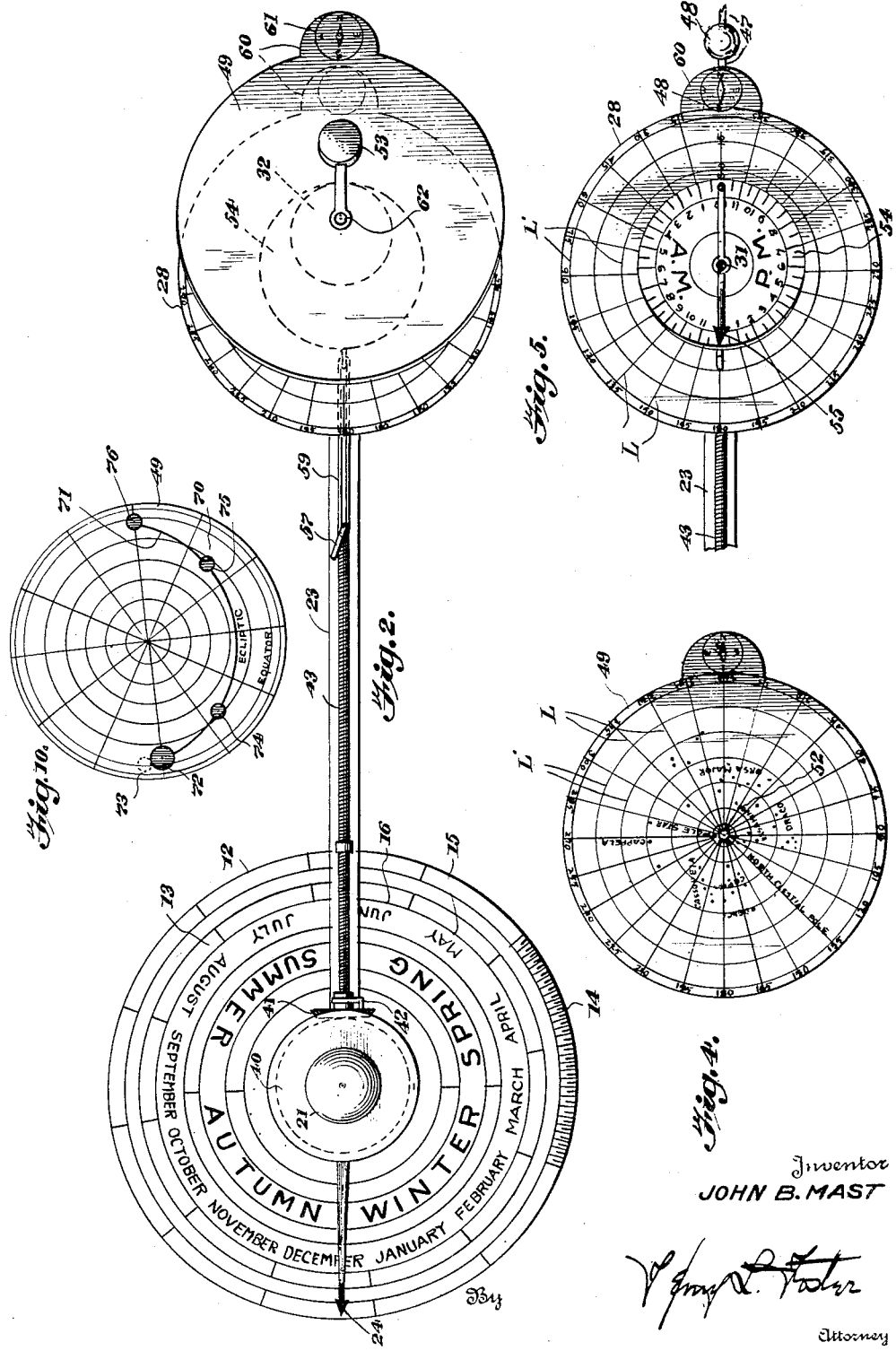

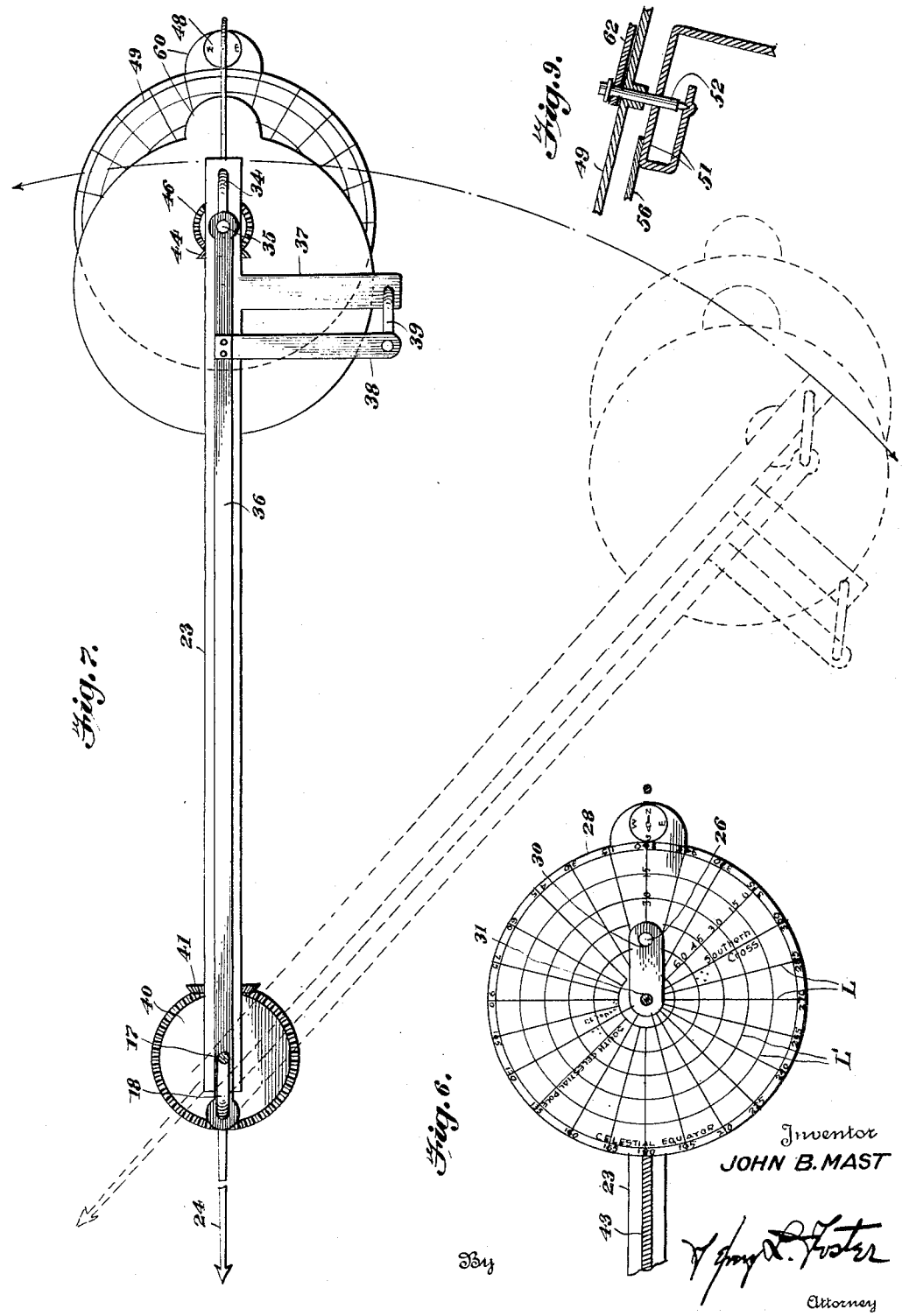

Patented Apr. 12, 1938

2,114,082

UNITED STATES PATENT OFFICE 2,114,082

TELLURIAN

John B. Mast, Meyersdale, Pa.

Application October 15, 1937, Serial No. 169,263

6 Claims. (Cl. 35—45)

The present invention relates to star finders by means of which persons interested in observing the heavenly bodies may readily and easily determine where such bodies may be located. The invention relates also to tellurians by means of which the relation of the earth to the sun, its orbit, and the reasons for its varying seasons may be demonstrated, and by means of which the relation of the moon to the earth may be demonstrated. The device is a combination of two types of instruments in which various features pertaining to each of two uses are combined in order to enable the position of the stars in the sky at any time to be ascertained. The device has other uses; for example; if it is decided to observe any given star or constellation, it may readily be determined by use of the device at what time upon any given date the particular constellation will be overhead, and at what date the constellation will be in the sky during the dark hours.

The chief object of the invention is to provide an instrument of the class described which is relatively inexpensive.

Another object is to provide an extremely simple form of star finder and yet one that is sufficiently accurate for practical purposes.

Another object is to provide a novel form of star finder that embodies certain features of a tellurian by means of which to a certain extent the relation of the earth to the stars may be demonstrated.

Still another object is to provide a novel means of associating star charts with a terrestrial globe in such a manner that the positions of the stars with relation to the surface of the globe will correspond to the position of the stars in the sky when observed from the surface of the earth.

A further object is to provide a novel combination of star charts, a terrestrial globe, and an hourly time chart by means of which the position of a star with relation to any given point on the surface of the earth at any given time may be quickly and accurately determined.

Devices for demonstrating the motion of the earth about the sun and the moon about the earth are well known. Devices for indicating positions of stars in the sky are also well known. There are many forms of such devices that make use of star charts or maps of the sky, and recently there have been developed devices known as "planetariums" in which hollow spheres represent the sky and points of light upon the inner surfaces of such spheres represent the various heavenly bodies.

As is well-known to students of astronomy, stars are at such enormous distances from the earth that they appear to be in fixed positions. It is also known that the rotation of the earth causes the stars to apparently rise in the east and to journey across the sky to the western horizon, and that the progression of the earth in its orbit about the sun causes the celestial spheres to apparently change one degree each day. The result of the earth's motion, therefore, is to bring new stars into the celestial sphere each night and to cause them to appear to travel across the sky, whereas, as a matter of fact, the stars are in fixed positions which have been charted and therefore, may be located at any given time. The subject of the present invention enables such fixation of the positions of the stars.

In the accompanying drawings:

Figure 1 is a side elevation of the device.

Figure 2 is a top plan view.

Figure 3 is a detailed view of a portion of the calendar disk of the device.

Figure 4 is a sectional view on the line 4—4 of Figure 1.

Figure 5 is a sectional view on the line 5—5 of Figure 1.

Figure 6 is a sectional view on the line 6—6 of Figure 1.

Figure 7 is a sectional view on the line 7—7 of Figure 1.

Figure 8 is an enlarged detail view of the mechanism that supports and operates the star chart, the moon sphere and the earth globe.

Figure 9 is a sectional detailed view of the mounting for the upper disk.

Figure 10 is a plan view of an attachment for showing the paths of the sun and planets.

Describing the drawings more particularly, the device is supported by a suitable base 10 which may take the form of a tripod carrying a slidably adjustable upright 11. Supported upon the upper end of the upright 11 is a table-like disk 12 upon the upper surface 13 of which is a calendar, best illustrated in Figure 2. The calendar is divided, preferably about its outer margin, into a series of 365 equal portions as indicated at 14, each portion representing one day. Adjacent this scale of days, the months are indicated by twelve divisions of proper size to include the correct number of days and indicated at 15. The seasons may be indicated in the manner shown at 16. The disk 12 as described enables the device to be set upon any date and also enables the succession of the months and seasons to be demonstrated when the device is operated as a tellurian.

The table 12 carries at a point set off to one side of the center of the disk an upstanding shaft having an upright portion 17. As will later be described, this upright portion performs the function of a crank. The shaft, at a point spaced above the surface 13 of the disk is bent at 18 to return to the center line of the disk at which point it is bent upwardly to form a pivot shaft 19. The crank and shaft members 17 and 19 are hollow and the latter carries at its upper end an electric socket 20, surrounded by a globular shade 21 made of frosted glass or other translucent material. An electric cord 22 passes through the shaft of the socket 20 for the purpose of illuminating an electric bulb within the globe 21 to represent the sun.

Above the crank portion 17 and pivotally connected at one end to the shaft 19 is an arm 23 that may be swung about the shaft 19 as a center, to sweep over the surface 13 of the disk 12. The end of the arm that is pivoted upon the shaft 19 carries a pointer 24 that is advantageously downwardly bent to a position closely overlying the surface 13 of the disk to indicate the date. The arm 23 extends in a straight line from the pointer 24 for a relatively great distance beyond the periphery of the disk 12, and upon its distal end is mounted the star finding device and a terrestrial globe.

This assembly last referred to is carried by an upright shaft 26 that is journalled near the end of the arm 23. Near the upper end of the shaft 26 is a collar that supports a disk 28, to be later more fully described. Above the disk 28 is mounted a supporting plate 29 having an upwardly bent tongue 30 that carries a shaft 31. The tongue 30 is bent at such an angle that the shaft 31, which is preferably at right angles to the tongue, is inclined at an angle of 23½ degrees from the vertical to represent the inclination of the axis of rotation of the earth. A terrestrial globe 32 is rotatably mounted upon the shaft 31 and is free for manual rotation thereon. A finger knob 33 may be added to the top of the globe for more ready operation.

It is well known that as the earth revolves about the sun the inclination of its axis remains constant and in the same direction. In order to demonstrate this fact the shaft 26 is continued below the arm 23 in which it is journalled, and is off-set at 34 to provide a crank 35. The crank 35 is connected to the upright crank portion 17 mounted upon the table 12, by a link 36. Inasmuch as cranks 17 and 35 have the same amount of throw, the shaft 26 will be rotated with respect to the arm 23 as the latter is moved upon its pivot 19, and the shaft 26 will be held in the same position with relation to space, and the direction of inclination of the shaft 31 will always be the same.

In order to throw the crank 35 past dead center, an arm 37 is mounted upon and standing at right angles, to the arm 23, as best shown in Figure 7. An arm 38 is carried by the link 36, and this arm extends at right angles to the link at a point adjacent the arm 37. Arms 37 and 38 are connected by a crank 39 having the same distance of throw as do cranks 35 and 17.

The shaft 19 carries a gear 40 and the arm 23 carries cooperating gear 41. Advantageously these gears, as shown in Figure 1, are bevel gears.

A bracket 42 supports the gear 41 and the end of a cable inclosed in a flexible casing 43 supported upon the upper surface of the arm 23. Adjacent to the shaft 26 a bifurcated bracket 44 is mounted on the arm 23, and this bracket carries a bevel gear 45 connected by the shaft to gear 41, and that drives a bevel gear 46 rotatably mounted on shaft 26. An arm 47 is secured to the gear 46 and extends outwardly and upwardly to a point beyond the disk 28 where it carries a sphere 48 that represents the moon.

The mechanism so far described constitutes a simple form of tellurian suitable for demonstrating the motion of the earth and of the moon and the succession of seasons upon the earth. With the apparatus in the position shown in Figure 1, it will be seen that the pointer 24 indicates a point approximately in mid-winter and that the inclination of the globe 32 renders the Northern Hemisphere in a position remote from the sun. As the arm 23 is swung about the pivot 19 the shaft 26 is revolved with respect to the arm 23, by the action of the cranks, and the inclination of the earth is maintained in the same direction; demonstrating the effect that the inclination has upon the angular relation of any portion of the surface of the earth to the sun, and illustrating the succession of seasons.

As the swinging motion of the arm 23 occurs, gear 46 will be rotated through the gearing 41, 43, and 45 by the stationary gear 40, causing the arm 47 and consequently the moon sphere 48 to revolve about the shaft 26 as a center. The operation of the moon is merely demonstrative due to the impossibility of gearing it so accurately as to render its motion chronologically correct. It is sufficient, however, to demonstrate the phases of the moon and its progressive rise and fall in the sky during the change of the seasons from summer to winter and vice versa.

In order that the device may be used for the purpose of locating stars in the sky the following mechanism is mounted in association with the globe 32. The upper surface of the disk 28 as indicated in Figure 5 bears a circular star chart of the southern celestial hemisphere, with the south celestial pole at the center of the disk and underlying the center of the rod 31 that forms the axis of rotation of the terrestrial globe 32. By reason of this arrangement the shaft 26 that supports the disk 28 does not underlie the center of the disk, but the latter is eccentric upon the shaft. Inasmuch as the disk 28 is rigidly secured to the collar 27, and the latter is secured to the shaft 26, the disk will rotate with respect to the arm 23 as the latter is swung upon its pivot, and similarly to the shaft 26, any portion of the disk will retain its direction from the center of the disk.

It will now be apparent that when the star chart upon the surface of the disk 28 has been initially set to correspond with the actual arrangement of the stars in the heavens, the chart will maintain this position but the direction of the stars from the center point of the chart, will correspond to the direction of the stars from the south celestial pole. Therefore the direction of a constellation or other heavenly body upon the chart from a point upon the globe 32 will always be the same as the direction of the actual body from a corresponding point of observation upon the earth's surface.

In order to provide a similar chart for the northern celestial hemisphere, a second star chart is carried by a second disk 49, arranged above the terrestrial globe 32. The northern star chart shows the positions of the constellations of the northern celestial hemisphere, and like the chart 28, in order to be effective, it must be held in proper relation to space, as the arm 23 is moved. In order to accomplish this result the disk 49 is carried by a supporting standard 50 that is in turn carried by the shaft 31, and that passes outwardly and upwardly beside the globe 32, and then to a point above the center of rotation of the globe where it may be rebent to form spaced arms 51 that comprise a supporting means for bearings in which a shaft 52 is journalled. The angle of the arm 51 and the bearings are so related that the shaft 52 is disposed upon the center line of the shaft 31 and the axis of rotation of the globe 32.

The shaft 52 carries at its upper end the disk 49 the central point of which is secured to it. To permit the disk to turn easily to retain it in proper relation to space, and to the disk 28, the bearings in the arm 51 in which the shaft 52 turns are delicate and advantageously are jewelled. The disk 49 carries a weight 53 near the periphery and at a point that is to be directed toward the north. Because the inclination of the shaft 52 is maintained toward the north by the rotation of the shaft 26 in the arm 23, the weight 53 will remain toward the north, this being constantly the lowest portion of the periphery of the disk. A star chart of the north celestial hemisphere is placed upon the lower surface of the disk 49.

It has been found advantageous to select the north as a point upon which the charts are adjusted, and conveniently the charts are marked at points upon their respective peripheries to indicate that these two points should be in vertical relation to each other, and turned toward the north pole of the earth. With such an arrangement, as the arm 23 is swung over the calendar disk 13, chart 28 will be held in proper position by reason of the crank and link arrangement, while the upper disk 49 will be held in proper position by means of the weight 53 as above described.

With the mechanism so far described, it will be apparent that the globe 32 and the two star charts do not change their relative positions during the motion of the arm 23, and that the angle of inclination of the globe and upper chart will remain constant and in the same direction.

In order to render the device practically operable, it is necessary to have some means of determining at what time particular stars are visible, and in some measure their angular relations to the celestial equator as well as their longitudinal positions in the sky. To accomplish this an hour disk 54 is revolubly mounted upon the shaft 31 and a pointer 55 is secured to the bottom of the globe 32 in such a manner as to sweep over the disk 54 as the globe is rotated. As a matter of convenience in operation the pointer 55 and the support 50 are secured together and to the globe 32, so that all rotate together. In this manner the support 50 may serve as a convenient means for turning the globe. Advantageously a pointer 56 is carried by the upper portion of the support 50 in a parallel and overlying relation to the pointer 55.

In order to maintain the hour disk 54 in proper relation to the sun globe 21, without interfering with the motion of the moon 48, a hook 57 is mounted on the arm 23 in the plane which passes through the axis of rotation of the globe 32 and the center of the globe 21. A second hook 58 is secured to the hour disk 54 and a link 59 which advantageously may be a band, connects the hooks 57 and 58 so that the disk 54 will be held with one point constantly toward the sun globe 21. The hook is so formed as to be out of the path of the moon-sphere. The disk 54 is divided into twenty-four equal portions, representing the hours of the day, and the noon point is adjacent the hook 58 which maintains the noon point toward the sun globe at all times.

The charts 28 and 49 of the southern and northern celestial hemispheres respectively are best illustrated in Figures 4 and 6. Referring to Figure 4 it will be seen that the charts are divided into radially disposed longitudinals L separated 15 degrees, and circular lines of latitude L spaced to correspond to the spacing of 15 degrees of the celestial hemisphere. For convenience the numbering of the degrees is begun at the standard point of celestial longitude, namely, the point in the sky at which the ecliptic crosses the equator between the constellations Aquarius and Pisces. As a matter of convenience in adjusting the chart disks, they may be provided with extended portions 60, and small magnetic compasses 61 may be carried by these extensions.

When the device is to be set up, the table 12 is turned so that the proper date is toward the south, this date being about December 22. At this point the plane in which the axis of rotation of the globe is inclined, passes through the center of the arm 23 and through the center of the sun globe 21, and the pointer will indicate the date of December 22. This is the position in which the north pole is at its greatest inclination from the sun and is known as the "Winter solstice." The supporting parts 29 and 31 that are connected with shaft 26 and the shaft 31 respectively, may be adjustable, so that the plate 29 can be turned on the end of the shaft 26 to adjust the angle of inclination to the proper direction. When this condition of the parts has been obtained (illustrated in Figure 1) the disks 28 and 49 are turned to adjust their longitudinals to proper position, bringing the charts into proper relation to the skies. This operation may be assisted by compasses 61, that are so arranged on the chart that the center points upon which the needles swing lie upon the longitudinals that extend to the north. Advantageously the weight 53 is carried by an arm 62, pivoted upon the shaft 52 and that is sufficiently resilient to press the weight against the surface of the disk. In this manner the weight may be shifted in its position adjacent to the periphery of the disk 49. In order to vary the position that the disk will assume under the influence of the weight, the latter may be shifted until the disk assumes a corresponding position to that of the disk 28.

Referring to Figure 1, the reason for supporting and turning the upper disk 49 in the fashion described becomes apparent. Inasmuch as the hour disk 54 must be held with its noon point directed toward the sun, and the said disk is mounted rotatably upon shaft 26, it is essential that a holding connection, as the hooks 57 and 58 be established between the disk 54 and a point upon the line toward the sun. It therefore is necessary that the support for the upper disk lie within the periphery of the disk 54 to avoid interference with the hook 58. The manner of supporting the disk 49 by the member 50, that passes to one side of the terrestrial globe 32 and is secured to the globe as well as to the pointer 55 affords not only a means of supporting disk 49 but a means that does not interfere with the hook 58. The support 50 also affords a convenient means of manipulation, by means of which the globe 32 may be turned.

The structure of the device having been described, its operation and use will be set forth. When the device is to be used as a tellurian, the arm 23 may be swung. This will result in the motion of the earth globe 32 about the globe 21 that represents the sun, and the manner in which its inclination remains in the same direction will become apparent. During such motion the moon sphere 48 will be revolved about the sphere 32, illustrating the manner in which the moon revolves about the earth. When the light within the globe 21 is illuminated, the phases of the moon will be illustrated by the proportions of light and shadow upon that surface of the sphere 48 that is toward the globe 32.

In order to give the device some of the advantages of a planetarium, the following attachment illustrated in Figure 10 may be used. In that figure the chart carried by the disk 49 is illustrated as being covered by a smooth surfaced transparent body as a sheet of Celluloid 70. A line 71 crosses the chart in the curved manner as illustrated. This line indicates the ecliptic, which is the apparent path of the sun across the sky during the year. As before mentioned the progression of the earth in its orbit has the effect of apparently causing the sky to advance one degree for each day. Therefore, by placing detachable markers upon the ecliptic line 71, the position of the bodies represented by the markers may be determined. In order to cause the proper progression of such bodies, they must be moved each day, a distance corresponding to the motion of the respective planets they represent.

Referring to Figure 10, a marker representing the sun is illustrated at 72, this representing the approximate position of the sun on September 12. It will be seen that the sun is approaching the celestial equator represented by the boundry of the disk 49. On September 23 the sun will be above the equator and consequently the disk 72 would be moved to a position directly on the equator, after which it would be moved to the south celestial hemisphere chart to indicate that the sun is on that date and subsequently, south of the equator of the earth.

Different sized markers may be used to represent the different planets in a similar manner. For example, a marker 73 indicates the position of Neptune while markers 74, 75, and 76 respectively, represent Venus, Uranus, and Saturn.

The type of marker to be used may vary. Probably the most desirable form is a small vacuum cup that will stick to the surface of the chart 70 and permits its ready removal and placement in a new position. Similarly, small paper disks may be pasted to the surface of the chart 70 and removed from day to day, to be replaced by other disks, in new positions. It will also be obvious that a small marker may be used to represent the moon, and moved approximately 12½ degrees upon the chart for each day.

Referring to the star finding mechanism, it will be seen that as the arm 23 is swung the disks 28 and 49 will remain in the same relative positions to each other and to the earth globe 32. Assuming that the pointer 55 extends from a point beneath that portion of the globe corresponding to the point on the earth at which the observer is located, it will be apparent that upon the setting of the pointer upon any given hour of the hour dial 54, the globe 32 will assume the position with respect to the star charts that the earth occupies with respect to the heavens at that time. Therefore, when the observer moves the arm 23 until the pointer 24 indicates a desired date, and then sets the pointer 55 upon any given hour, the portion of the globe 32 will be directed toward that point of the star sheet that corresponds to the portion of the heavens visible from the observer's position at the selected date and hour. By referring to the latitude and longitude lines upon the star chart, at which heavenly bodies appear, it is a simple matter to locate them from the observer's position.

A further use of the device may also be made. If an observer is interested in one particular star constellation or other heavenly body, he may locate the same upon the chart, and to determine at what time and upon what date the constellation will be visible from his position, he may swing the arm 23 until the representation of the constellation upon the chart is on the "dark side" of the globe, which is the side of the globe 32 away from the globe 21. This will show that the star is visible from the earth's surface on the date indicated by the pointer 24. To facilitate this operation, the notations "a. m." and "p. m." may be placed on the hour disk 54 and indicating respectively day and night. Having placed the apparatus in this position with the constellation on the chart within the dark hour portion of the hour disk, the operator by means of the support 50 or the knob 33, turns the globe 32 until the pointer 55 and the pointer 56 point in the direction of the constellation in question. By noting the date and the hour, the observer determines just when the constellation will be visible, and by noting its position upon the star chart, he can determine upon what part of the sky he should direct his attention.

It will be obvious that various refinements may be employed. For example: the upper disk 49 may be made of transparent material with the chart printed on either surface so that the position of the pointer 56 may be observed directly from the upper side of the disk. It will also be apparent that the charts shown in Figures 4 and 6 may be made much more complete, only a few constellations being shown in those figures, in order to illustrate the manner in which the device is to be used. For example, much larger numbers of star points may be placed upon the chart and numerical keys used to define their identities.

The device has many advantages. Perhaps its chief advantage is that its simplicity and the simplicity of its parts of which it is made, which enables it to be constructed at a very reasonable cost. This will permit its use in many schools that have hitherto been unable to obtain such devices, in which the advantages of demonstrating by such a device are obvious. For the same reason it is within the reach of many persons who are interested in astronomy and its star finding features are sufficiently accurate to render it an extremely valuable instrument for such purposes.

As a tellurian, the device is sufficiently accurate for demonstration purposes. As a star finder, it answers a long felt want for an instrument that will enable the location of stars in a simple manner, without complicated calculations as to time, date, and position. At the same time the use of the device demonstrates in a readily understandable fashion, the relations of the stars to the earth, and the reasons for their apparent changes in position in the skies.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. In a tellurian including a globe support mounted for orbital movement about a center point representing the sun, the combination with a terrestrial globe rotatably mounted on the support, of a chart of one of the celestial hemispheres rotatably mounted upon the globe support and surrounding the axis of rotation of the terrestrial globe, the said chart being rotatable with respect to the globe as well as the support, and means for maintaining the points on the chart in the same directions from the center during the orbital movement of the support.

2. In a tellurian including a globe support mounted for orbital movement about a center point representing the sun, the combination with a terrestrial globe rotatably mounted on the globe support, of a chart of one of the celestial hemispheres mounted upon the globe support for rotation with respect to both the globe and the support, upon the axis of rotation of the globe as a center, means for maintaining the points of the chart constantly toward the same points of the compass during the orbital movement of the support, and means for maintaining a longitudinal upon the surface of the globe toward the center point representative of the sun, during the orbital movement of the support about the said point.

3. In a tellurian including a globe support mounted for orbital movement about a center point representing the sun, the combination with a terrestrial globe rotatably mounted on the support, a chart of one of the celestial hemispheres mounted upon the globe support for rotation with respect to both the globe and the support, upon the axis of rotation of the globe as a center, and means for maintaining the points of the chart constantly toward the same points of the compass during the orbital movement of the support, of an hour disk mounted for rotation about the axis of rotation of the globe as a center, the said disk being rotatable with respect to the globe, the chart and the support, and the surface of the disk being divided into twenty-four equal parts to represent the hours of the day, and means for holding the disk with one point constantly toward the center point that represents the sun.

4. In a tellurian including a globe support movable in a horizontal orbit about a center point representing the sun, and calendar means associated with the support to indicate the date at which the earth is in a position corresponding to that of the support, the combination with a terrestrial globe rotatably mounted upon the globe support, of a disk having a chart of the south celestial hemisphere upon its surface mounted upon the globe support below the globe for rotation about the axis of the globe as a center, the said disk being rotatable with respect to both the globe and the support, a second disk mounted above the globe for rotation, with respect to the globe and the support, about the axis as a center, the said second disk carrying a chart of the north celestial hemisphere, and means for maintaining points on the two disks constantly toward the same points of the compass, and the points upon one disk in the same position with respect to those upon the other disk, during the orbital movement of the globe support.

5. In a tellurian including a globe support movable in a horizontal orbit about a center point that represents the sun, calendar means associated with the support to indicate the date upon which the position of the earth corresponds with that of the support by the travel of the earth in its orbit, a terrestrial globe mounted upon the globe support for rotation about an axis inclined from the vertical to represent the inclination of the earth's axis, and means for maintaining the angle of inclination of the axis of the globe toward the same point of the compass during orbital movement of the support and globe, a chart of one of the celestial hemispheres carried by the globe support and rotatable, with respect to both the support and the terrestrial globe, about the axis of the said globe as a center, the said chart being mounted at substantially right angles to the said axis whereby the surface of the chart lies in an inclined plane, and a weight mounted on the chart adjacent a point on its periphery for holding that point of the periphery of the chart in the direction of the angle of inclination of the axis of the globe during the orbital movement of the support and globe.

6. In a tellurian including a table-like disk having its periphery divided into equal spaces to correspond with the days of the year, an arm pivoted at the center of the disk for horizontal swinging motion about the center and over the disk, a support rotatably mounted on the arm at a point spaced from the center, and means for maintaining the support constantly in the same relation to the points of the compass, in combination, a chart of the south celestial hemisphere secured upon the support, a shaft mounted on the support, and extending upwardly from the pole point of the chart at an angle of substantially twenty-three and one half degrees from the vertical and toward the celestial north point of the chart, a terrestrial globe rotatably mounted on the shaft, a supporting bracket secured to the globe and extending above it, a disk having a chart of the north celestial hemisphere on its surface rotatably carried by the support and disposed in an inclined plane at substantially right angles to the inclined shaft upon which the globe is mounted, and a weight mounted upon the last mentioned disk adjacent its periphery at a point toward the celestial north point of the chart.

JOHN B. MAST.